United States Patent [19]

Nagata

[11] Patent Number: 4,771,681

[45] Date of Patent: Sep. 20, 1988

[54] AUTOMATIC BEAN CURD MANUFACTURING APPARATUS

[75] Inventor: Zenji Nagata, Yamato Takada, Japan

[73] Assignee: Sanyo Shokuhin Kabushiki Kaisha, Yamato Takada, Japan

[21] Appl. No.: 71,668

[22] Filed: Jul. 2, 1987

Related U.S. Application Data

[62] Division of Ser. No. 924,819, Oct. 30, 1986.

[30] Foreign Application Priority Data

Aug. 30, 1986 [JP] Japan .................................. 61-203998

[51] Int. Cl.⁴ ............................ A23J 1/00; A23L 1/20
[52] U.S. Cl. ....................................... 99/483; 53/127; 99/453; 99/484; 99/536
[58] Field of Search ................ 99/483, 516, 484, 517, 99/536, 452–455, 486, 487; 426/634, 656; 53/431, 440, 111 R, 127

[56] References Cited

U.S. PATENT DOCUMENTS

| | | | |
|---|---|---|---|
| 4,427,710 | 1/1984 | Terada et al. | 426/634 |
| 4,514,433 | 4/1985 | Matsuura | 426/634 |
| 4,534,283 | 8/1985 | Nakamuta | 99/483 X |
| 4,664,919 | 5/1987 | Yan et al. | 426/634 X |
| 4,681,029 | 7/1987 | Bartesch et al. | 99/516 X |

FOREIGN PATENT DOCUMENTS 1037077 2/1986 Japan .................................. 426/634

*Primary Examiner*—Timothy F. Simone
*Attorney, Agent, or Firm*—Wenderoth, Lind & Ponack

[57] ABSTRACT

An apparatus for automatically manufacturing bean curd and at high production efficiency, free from sticking together of the cut pieces of bean curd and from the propagating of germs. This apparatus comprises a coagulating tank, a bean curd cutting device, a separating device and a packing device. Processes by these devices are carried out in hot water of the temperature at which various germs can not live so that bean curd in a germ-free condition can be produced. Unlike previous devices, both the cutting and packing devices function with hot water keeping the bean curd continuously covered. In this manner the integrity and cleanliness of the bean curd is maintained.

4 Claims, 4 Drawing Sheets

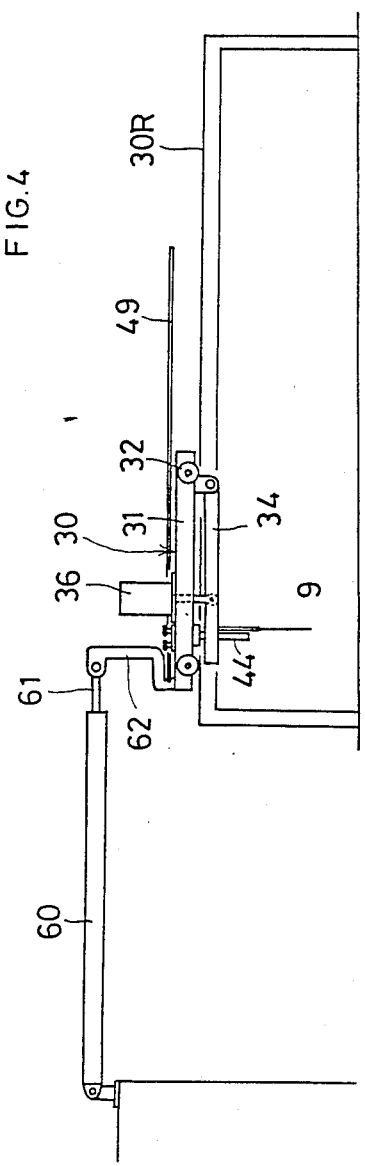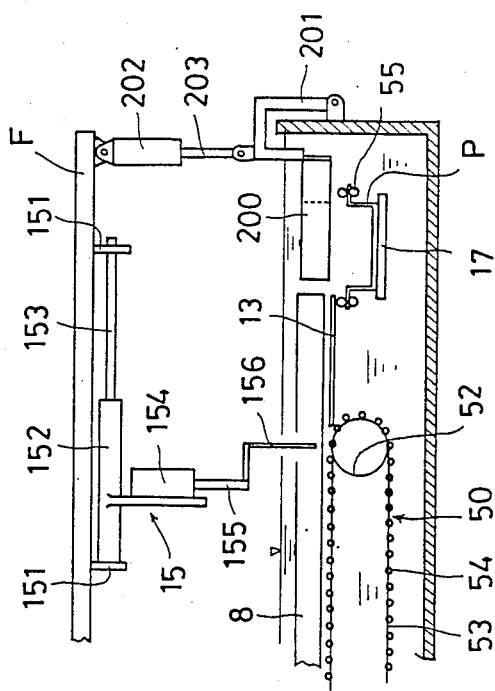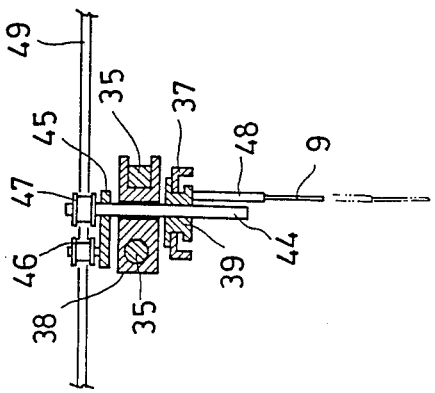

4,771,681

AUTOMATIC BEAN CURD MANUFACTURING APPARATUS

This application is a divisional of application Ser. No. 924,819, filed Oct. 30, 1986.

BACKGROUND OF THE INVENTION

Description of the prior art

Fine-grained bean curd (so-called KINUKOSHI TOFU in Japanese) is generally manufactured in the following way namely, soybeans kept soaked in water are crushed and boiled and then soybean milk is obtained by separating bean curd refuse. Soybean milk thus obtained has a temperature of around 80° C. This soybean milk of high temperature is mixed with a coagulating agent and is coagulated into fine-grained bean curd. Bean curd is classified into "filled bean curd" and "cut bean curd" according to the method of manufacturing the bean curd. In the case of filled bean curd, soybean milk of high temperature is cooled, is mixed with a coagulating agent, is poured into a pack of a size and a shape corresponding to one piece of bean curd, and the pack is sealed hermetically. The pack containing soybean milk is heated to such an extent that the soybean milk therein coagulates. In manufacturing the filled bean curd in the above way, the air which intermingles with soybean milk when soybean milk is put in a pack and is sealed hermetically produces air bubbles, when heating the soybean milk or with the lapse of time after filling. Such air bubbles float on the surface of soybean milk, and if soybean milk is coagulated in this state, bubbles are formed at the surface of bean curd. Presence of these bubbles will lower the commodity value of bean curd. In order to avoid forming such bubbles, a deaerator is used for letting the mixed-in air out of the soybean milk. Yet, perfect deaerating is impossible.

As compared with filled bean curd, in the case of cut bean curd soybean milk is coagulated in a coagulating box of the size corresponding to at least several pieces of bean curd and the coagulated piece is cut into several pieces of bean curd. In manufacturing the cut bean curd, when soybean milk is poured into a coagulating box air bubbles mingle with soybean milk but some of them get out of the soybean milk before the soybean milk coagulates, and bubbles are hardly formed at the surface of the bean curd.

Coarse-grained bean curd (so-called MOMEN TOFU in Japanese) is manufactured in the following way; namely, coagulated soybean milk is broken into many small blocks and such broken bean curd blocks are filled in a shaping box for pressing, dehydrating and shaping. Irrespective of whether manufacturing fine-grained bean curd or coarse-grained bean curd, calcium sulfate is generally used as a coagulating agent, but it has been known that the use of magnesium chloride (known as natural bittern) in place of calcium sulfate produces delicious bean curd. This natural bittern imparts a sweet flavor to bean curd for manufacturing of delicious bean curd and differs from calcium sulfate as to the temperature and speed at which soybean milk is coagulated. The coagulating speed with natural bittern is faster than that with calcium sulfate. Therefore, use of natural bittern for coagulating purposes is preferable and can safely be applied to manufacturing of coarse-grained bean curd. However, when using natural bittern for manufacturing fine-grained bean curd, it is necessary to cool down soybean milk to around 80° C. before mixing natural bittern in it, because if natural bittern is mixed in soybean milk of high temperature, coagulation starts at once and uneven bean curd will result. However, from the viewpoint of productivity and other considerations, there is a limit to the soybean milk cooling down temperature. Therefore, in manufacturing fine-grained bean curd, it has been the usual practice to use natural bittern in the quantity about 10-20% of the total weight of coagulating agent used. Mixing of natural bittern at the ratio of more than 20% for manufacturing fine-grained bean curd causes uneven coagulation, with the resulting production of rather coarse-grained bean curd of less commodity value. Thus, mixing of more than 20% natural bittern for manufacturing fine-grained bean curd was impossible. Even when 20% natural bittern is mixed in, if a coagulating agent comprising 20% magnesium chloride and 80% calcium sulfate is mixed in soybean milk at one time, irregular coagulation occurs and, therefore in this case, magnesium chloride which is 20% of the total weight of the coagulating agent is first mixed in, and then 80% calcium sulfate is added. Thus, it takes more time and requires a greater number of steps to manufacture fine-grained bean curd by using natural bittern and that there is a limit in the quantity of natural bittern to be used. Therefore, although it is generally admitted that in manufacturing fine-grained bean curd, the more the quantity of natural bittern used, the more delicious the bean curd, there has been a limit in the quantity of natural bittern to be used for manufacturing of fine-grained bean curd.

Since fine-grained bean curd is soft and is very easy to break, when fine-grained bean curd manufactured in a specified shape is put piece by piece in a pack, such packing cannot be done in the air. It has therefore been a usual practice in packing fine-grained bean curd to soak fine-grained bean curd in water, have the worker dip up the curd carefully piece by piece out of the water by hand and put one piece each in a pack held by the other hand. Packs, each containing one piece of bean curd, are supplied to an automatic packing machine through a conveying means, such as a conveyor, or manually for wrapping up in a thin film, such as polyethylene film, and then shipped. Packing of bean curd is an indispensable operation for a bean curd manufacturer which manufactures bean curd in large quantities for wholesaling to super markets and retailers. However, given that fine-grained bean curd is soft and very easy to break as mentioned before, it is impossible to pack bean curd automatically or mechanically. For this reason, fine-grained bean curd is dipped up carefully out of the water in which it has been soaked and then is packed. This involves poor efficiency and requires many hands in a manufacturing process. Moreover, because bean curd is soaked in the water of in lukewarm water, sundry germs easily stick to the bean curd and there is the fear that such sundry germs propagate after seal-packing and bean curd itself does not keep long.

SUMMARY OF THE INVENTION

The present invention has for an object to provide a method of automatically manufacturing bean curd. The method comprises a coagulating process, in which a coagulating agent of specified ratio is mixed with soybean milk, and such mixture is coagulated in a trough-shaped coagulating tank while it is conveyed continuously in the tank, a separating process in which bean curd obtained by the coagulating process is cut into pieces of regular shape while it is conveyed in the tank and cut pieces of bean curd are separated from each other for facilitating packing, and a packing process in which pieces of bean curd supplied from the preceding separating process are stuffed into each pack. These operations are done in hot water of the temperature at which germs are unable to live or be in the water.

BRIEF DESCRIPTION OF THE DRAWINGS

The accompanying drawings show the method and apparatus for manufacturing automatically bean curd according to the present invention, in which

FIG. 3 to FIG. 6 show respectively the second embodiments, in which FIG. 3 is a plan view showing the separating process and the packing process;

FIG. 4 is a side view of the separating process shown in FIG. 3;

FIG. 5 is a cross sectional view, on an enlarged scale, of a slider part; and

FIG. 6 is a longitudinal sectional view of the packing process.

DETAILED DESCRIPTION OF THE INVENTION

Figure 1:
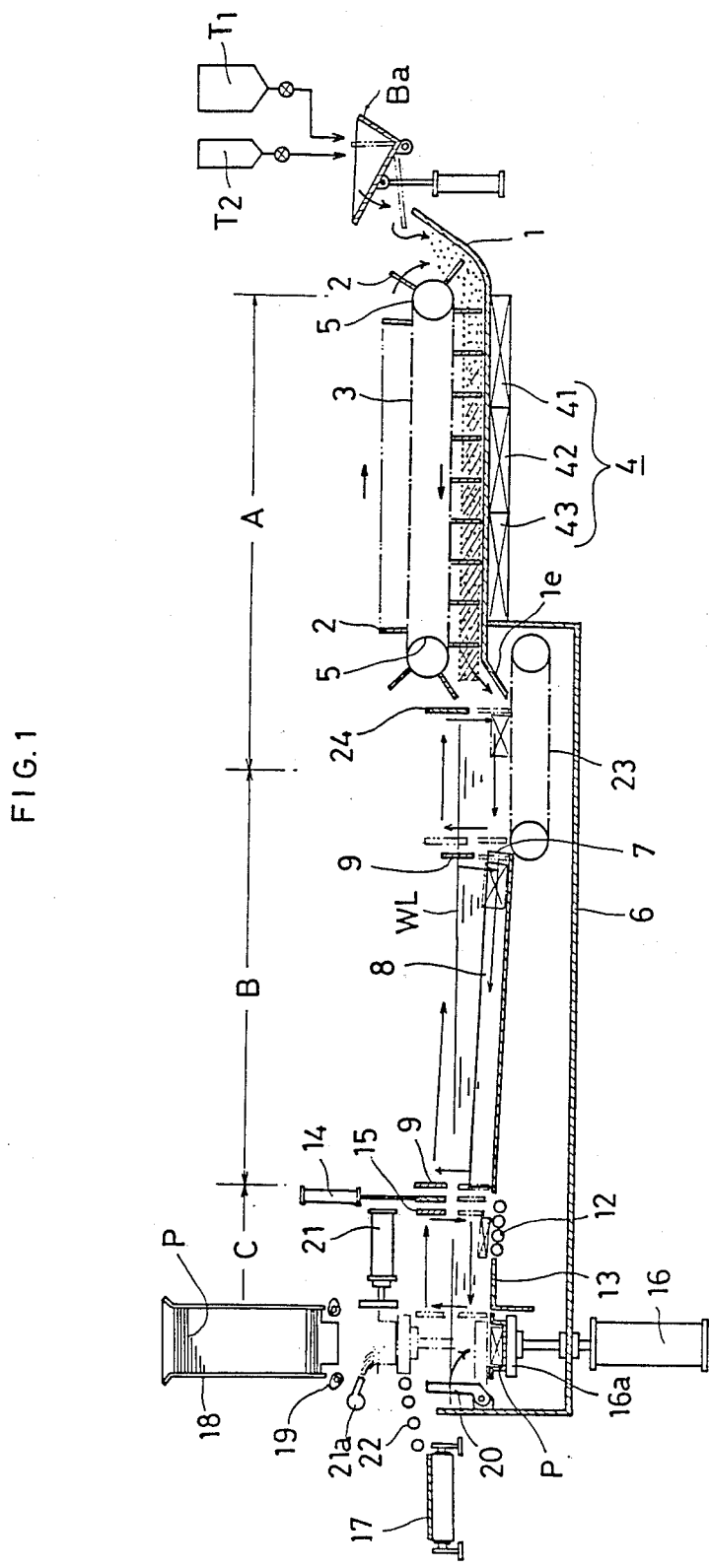
FIG. 1 is a sectional view showing an outline of the apparatus according to the present invention (the first embodiment)
Figure 2:
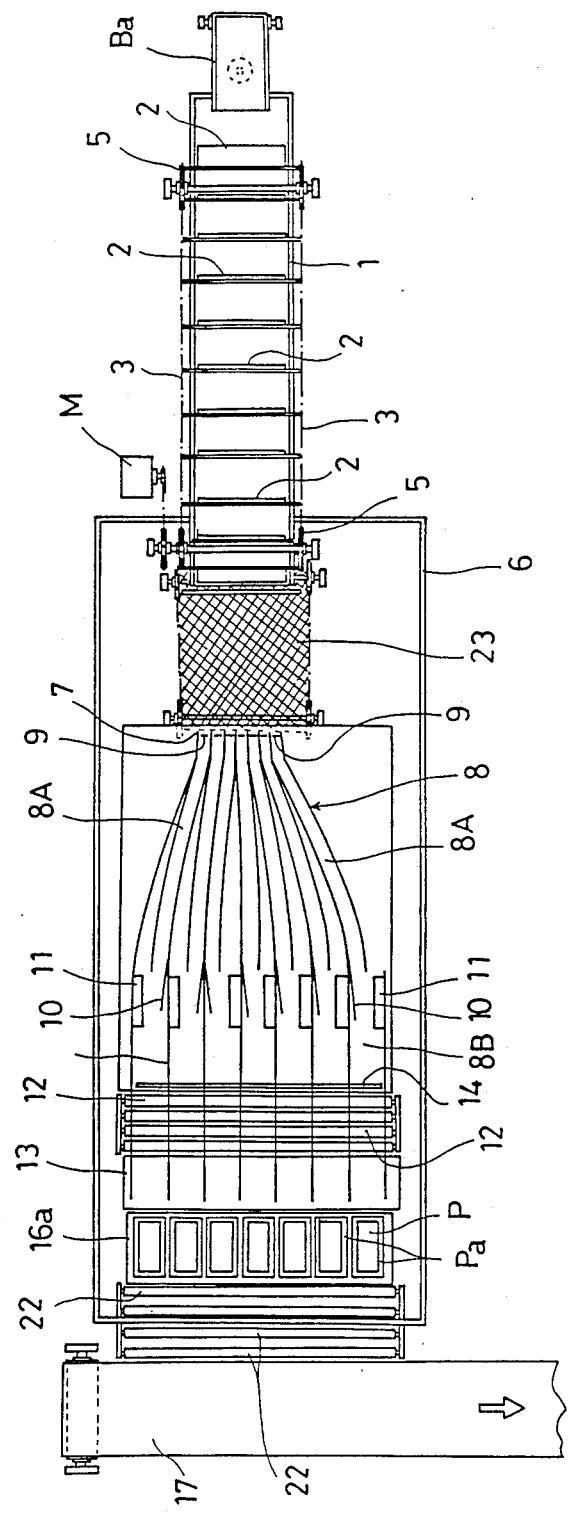
FIG. 2 is a plan view of the apparatus shown in FIG. 1.
Figure 3:
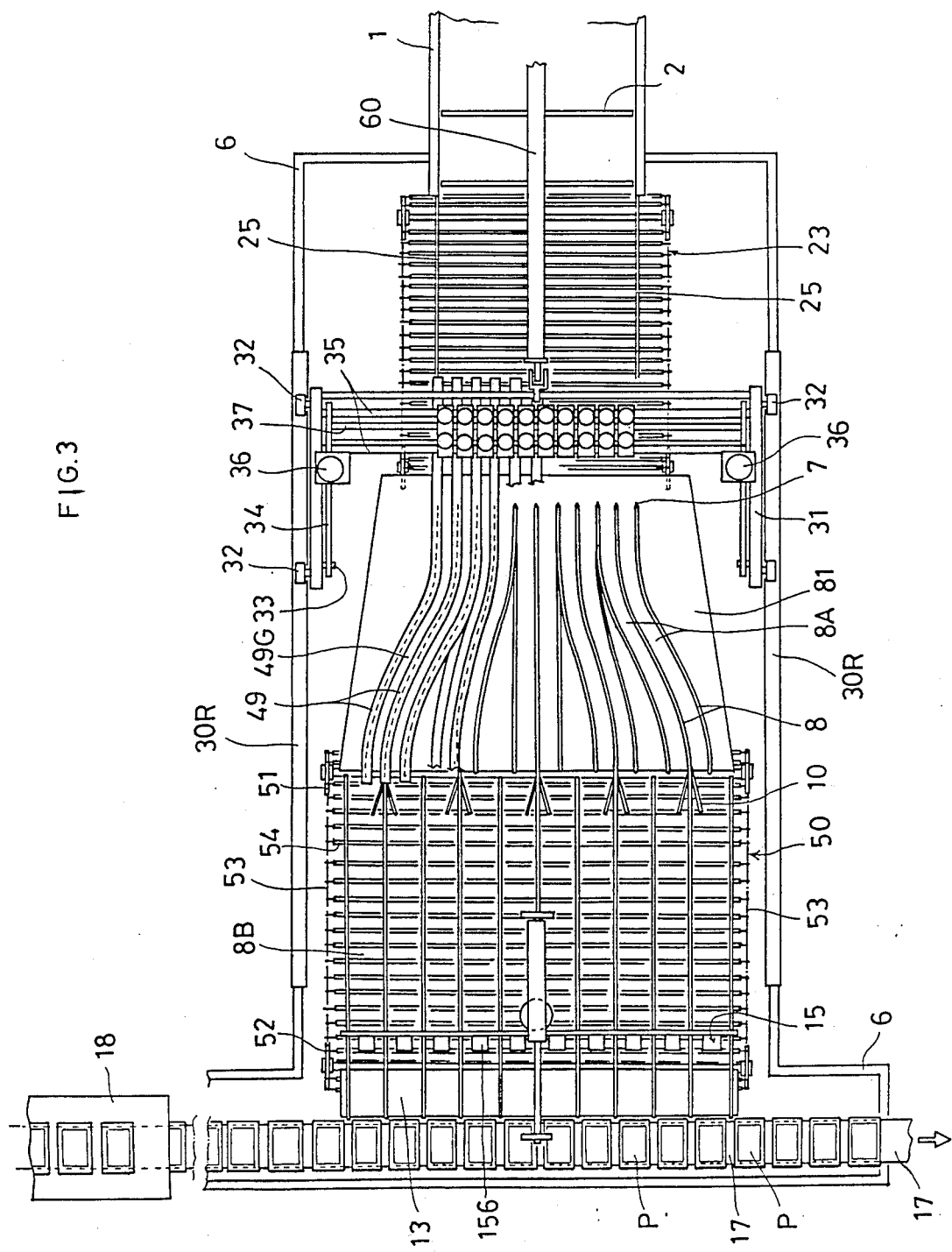

A description is made below about the method of manufacturing bean curd with reference to the first embodiment shown in FIG. 1 and FIG. 2.

The method according to the present invention comprises a coagulating process A in which a coagulating agent of the specified ratio is mixed with soybean milk of around 80° C. obtained by squeezing boiled soybeans and such mixture is stirred and is coagulated in the course of transferring, a separating process B in which bean curd obtained at the coagulating process is cut into pieces of the specified size and cut pieces are transferred as they are separated from one another for facilitating packing at the succeeding process, and a packing process C in which pieces of bean curd which were separated from one another and transferred are packed one by one in hot water in a tank. Coagulated bean curd is transferred in hot water of the temperature at which germs are unable to live.

Soybean milk obtained by squeezing boiled soybeans is of around 80° C. Therefore, if natural bittern (magnesium chloride) of the specified quantity is mixed directly with soybean milk, the soybean milk coagulates instantly and irregularity of bean curd will result. According to the present invention, temperature of soybean milk is lowered in accordance with the ratio of natural bittern in a coagulating agent so as to avoid irregularity of bean curd. The relation between the ratio of natural bittern to the total weight of a coagulating agent and the initial temperature of soybean milk to be put in the coagulating process is such that with the increase of the quantity of natural bittern, the initial temperature of soybean milk must be lowered by degrees, namely, according to the ratio of natural bittern, soybean milk is cooled from around 80° C. down to such a temperature at which soybean milk does not coagulate instantly by natural bittern to be mixed in. Soybean milk cooled down and a coagulating agent including the specified ratio of natural bittern are fed into a mixing bucket from a tank $T_1$ and a tank $T_2$ respectively. Then, the soybean milk and the coagulating agent in the mixing bucket Ba are supplied to the coagulating process A by tilting the mixing bucket Ba. At the coagulating process, soybean milk is transferred as it is re-heated up to around 80° C. at which it coagulates by the action of natural bittern. For this purpose, the coagulating process A comprises a trough-shaped coagulating tank having many transfer plates 2 fixed at regular intervals to endless chains 3. The length of the coagulating tank 1 and the soybean milk transferring speed are so determined that soybean milk coagulates while it is being transferred from the starting side to the terminal side. Also, a heating means 4 is arranged under the tank 1 so that soybean milk with which natural bittern is mixed at the starting side of the tank 1 may be heated to such a temperature at which it coagulates.

A pair of endless chains 3 are arranged in parallel with each other, above the tank 1 and extending over the whole length of the tank 1. Sprocket wheels 5 are engaged with the two chains 3 arranged in parallel and above both sides of the tank 1. One the sprocket wheels is driven at the constant speed or at variable speed by a driving device M, such as a motor. Many transfer plates 2 are fixed, at regular intervals, between the two chains 3, 3 arranged in parallel. These transfer plates 2 are so designed that they are transferred continuously in the trough-shaped coagulating tank 1. It is so designed that at every one pitch movement of the transfer plate, the bucket Ba is tilted once so as to supply soybean milk mixed with a coagulating agent to the starting side of the coagulating tank 1. The transfer plate 2 is of such size that it touches or nearly touches the inner surface of both sides and the inner surface of bottom side of the coagulating tank 1. Therefore, soybean milk mixed with a coagulating agent that was put in the tank 1 between two adjoining transfer plates 2 is transferred by the movement of the transfer plates as it is partitioned off.

As stated before, soybean milk mixed with a coagulating agent is heated by a heating means 4, such as electric heaters, steam heaters, etc. so that it coagulates while it is being transferred in the coagulating tank 1. For coagulating soybean milk effectively, it is recommended to arrange a plurality of heating means 41, 42, 43 extending over the whole length of the coagulating tank for facilitating the temperature adjustment at each block. By this arrangement, soybean milk is heated at the starting side heating means block 41 to a temperature higher than that of the other blocks so that soybean milk which was put in as it was cooled down a little may be heated in a short time up to a coagulating temperature. Heating means 42 at the central block and heating means 43 at the terminal end portion do temperature adjustments and heating so that the coagulating temperature may be maintained throughout the whole length of the coagulating tank 1.

A conveyor 23 is arranged on the same horizontal level with a bottom surface 1e at the terminal side of the coagulating tank 1 or a little lower than the bottom surface level, in such a fashion that it extends in lengthwise direction of the coagulating tank. Through the medium of this conveyor 23 the coagulating process A and the succeeding separating process B are connected with each other. While this conveyor 23 is provided in a hot water tank 6 of the separating process B, a pushing machine 24 is provided above the conveyor 23. This conveyor 23 is driven at a speed slightly faster than the moving speed of the transfer plate 2 so that one block of bean curd pushed out of the coagulating tank 1 and shifted onto the conveyor 23 is transferred to the separating process side, free from contact with the next block of bean curd, and is pressed accurately against a cutting blade 7 (at the starting side of the separating process) for cutting. Therefore, this pushing machine 24 descends at the position of rear end of the coagulating tank for pushing the rear end of bean curd on the conveyor 23. In this state, bean curd is moved in the driving direction of the conveyor 23 by the driving speed of the conveyor 23 for cutting by the cutting blade 7. After cutting, the pushing machine is lifted up and returned to its original position. Then, the pushing machine descends again and pushes the next bean curd on the conveyor toward the separating process side. These operations are repeated.

The separating process B comprises a hot water tank 6 connected to the coagulating tank 1, a plurality of cutting blades 7 to cut a big bean curd of cylinder form transferred from the coagulating process into each one piece of bean curd, guide plates 8 which are provided at the rear end of each cutting blade and are spread out like an unfolded fan and transfer plates 9 to transfer a cut piece of bean curd along transfer grooves 8A, 8B between guide plates 8 while separating cut bean curd from one another.

The hot water tank 6 of the separating process B is filled with hot water of around 80° C., in which germs are unable to live, on the same water level with the coagulating process A so that bean curd coagulated in the coagulating process A is transferred to the separating process B without contacting the air, thereby avoiding sticking and propagating of various germs.

Bean curd delivered to the separating process B is cut into the size corresponding to one piece of bean curd by the cutting blade 7 provided at the forward end of each guide plate 8 in the hot water tank 6. These guide plates 8 are sash-like plates set up at regular intervals and in a row in lengthwise direction of the hot water tank 6. Cutting blades 7 at the forward end side of guide plates 8 are so arranged that the space between blade edges corresponds to the thickness of one piece of bean curd. Guide plates 8 are arranged in such a fashion that the space therebetween becomes larger by degrees from the space between blade edges; namely, they spread out like an unfolded fan. One piece each of bean curd cut by the cutting blade is naturally led into the transfer groove 8A between guide plates 8 and is transferred by driving of the transfer plate 9. At this time, the cut bean curd is in upright state. Since guide plates 8 are arranged in such a fashion that they separate from each other by degrees in the shape of an unfolded fan, pieces of bean curd are separated from each other by in like fashion as they are transferred between guide plates 8 in the hot water tank 6. Thus, at the terminal portion of these guide plates 8 pieces of bean curd are separated from each other to such an extent that the space between them is suitable for the packing operation. Then, at the terminal portion of the separating process B pieces of bean curd are laid horizontally from the upright state so as to facilitate packing of bean curd, for which laying down plates 10 which lay against bean curd horizontally and receiving plates 11 corresponding to the laying down plates 10 are provided at the terminal portion of the guide plates 8. Laying down plates 10 are arranged in such a fashion that they incline from the guide plate and their angle of inclination becomes larger gradually from their base end portion toward their forward end portion. By means of these laying down plates 10 upright bean curds being transferred successively in the transfer grooves 8A by transfer plates 9 are laid horizontally by degrees. At the position where upright bean curd is going to be in horizontal state from the upright state, bean curd is directed by a receiving plate 11 corresponding to a laying down plate 10 and is led to the transfer groove 8B of larger width where bean curd lays horizontally. In such state, bean curd is transferred to the packing process C. Thereafter, transfer plates 9 rise above transfer grooves 8A, 8B and are sent back to the position of cutting blades 7 for transferring the next lot of bean curd.

The packing process C is contiguous to the guide plate 8 of the separating process B and comprises a roller conveyor 12, a receiving table 13, a stopper 14, a stuffer or pushing machine 15 and a pack lift 16. The roller conveyor 12 has a plurality of rollers at regular intervals and each roller is held rotatably in the hot water tank 6 and below the surface of the water WL. It is so designed that bean curd being transferred in the transfer grooves 8A, 8B by the transfer plate 9 is transferred onto the roller conveyor 12. The stopper 14 which ascends and descends in concert with the packing operation is disposed between the moving terminal end portion of the transfer plate 9 and the roller conveyor 12. While the stopper 14 is in an ascending position, bean curd is transferred to the roller conveyor 12 by the transfer plate 9 but while the stopper 14 is in a descending position, transfer of bean curd is suspended.

The receiving table 13 is contiguous to and on almost the same level with the roller conveyor 12. Bean curd slides on this flat receiving table 13 and is transferred to the packing side. In order to facilitate transferring of bean curd from the roller conveyor 12 to the receiving table 13 and to the packing side, the stuffer 15 is provided above the roller conveyor 12 and the receiving table 13. This stuffer 15 descends at the position of the rear end of bean curd on the roller conveyor and moves the bean curd toward the packing side through the receiving table 13. After the bean curd was stuffed in a pack fully, the stuffer 15 ascends or retreats.

The pack lift 16 has a lift table 16a on which packs P (one for each transfer groove 8B) are placed. These packs ascend and descend between the position just below a pack supplying machine 18 arranged above the hot water tank 6 and the position of bean curd stuffing below the surface of the water. It is so designed that while this lift table 16a is under water (shown by solid line in FIG. 1), the top surface of the pack P on the lift table 16a is one the same horizontal level with the receiving table 13 or a little below it so as to facilitate insertion of bean curd into a pack P by the stuffer 15.

Packs P are set in many layers in the pack supplying machine 18 which is above the hot water tank 6 and are drawn out downwardly and automatically one by one by means of drawing out rollers 19, in concert with the ascending and descending motion of the lift table 16a, namely, when the lift table 16a is in a ascending position, a pack is drawn out of the pack supplying machine and falls on the lift table 16a. On the lift table 16a a plurality of packs P are set as shown in FIG. 2. Then, hot water is poured into each pack P from a hot water supply nozzle 21a arranged below the pack supplying machine 18. This hot water should be of almost the same temperature as the hot water in the hot water tank 6. If the lift table 16a descends after supply of hot water to packs and sinks under the surface of the water, packs P also sink under the hot water down to the position shown by a solid line in FIG. 1, ready for insertion of bean curd. In order to ensure smooth insertion of bean curd, a pack presser 20 is provided swingably at the inner end portion of the hot water tank 6 and adjacent the lift table 16a. When the pack presser 20 is in perpendicular state, the lift table 16a is allowed to descend and ascend freely but when the lift table 16a descends with packs thereon and the pack presser 20 is swung from the perpendicular state to the horizontal state, a flange portion Pa at the circumference of the pack P, excepting the bean curd inserting side, is pressed by the packing presser 20. This pack presser 20 of side-facing U shape ensures accurate insertion of bean curd into the pack. After bean curd has been inserted in the pack, the pack presser 20 is swung to be put in perpendicular state, whereby pressing of the pack is released and the lift table 16a is allowed to ascend.

When the pack P in which bean curd was inserted is in an ascending position (shown by a chain line in FIG. 1) by the ascending of the lift table 16a, the pack P on the lift table 16a is pushed by the operation of a pushing machine 21 from the lift table side to the side of a sending out roller conveyor 22. As this roller conveyor 22 is slightly slanted, packs P slide on the roller conveyor 22 and are transferred onto a transferring conveyor 17 which is adjacent the roller conveyor 22 and then transferred to the next packing process (not shown in the drawing) where packs containing bean curd are wrapped up and sealed hermetically in packing materials, such as synthetic resin film.

A description is made below about the second embodiment shown in FIGS. 3-6.

The second embodiment is quite the same as the first embodiment in respect of the coagulating process A but is somewhat different from the first embodiment in respect to the separating process B and the packing process C.

In the second embodiment, the separating process B uses a transferring apparatus 30 which is a combination of the pushing machine 24 and the transfer plate 9 in the first embodiment. This transfer apparatus 30 has rails 30R on both side of the hot water tank 6 and on these rails 30R, a pallet 31 with wheels 32 is placed for travelling. This pallet 31 is placed on rails 30R in such a fashion that it moves over the hot water tank 6. A lift frame 24 is secured to the pallet 31 by means of an axis 33. By means of a lift cylinder 36 provided on the pallet 31, pallet 31 descends and ascends with the lift frame 34 as a fulcrum. The pallet 31 and the lift frame 34 are provided with two guide rods 35 and two guide bars 37 respectively. A plurality of sliders 38 are provided slidably in these guide rods 35. The number of sliders 38 is the same as that of the guide grooves 8A, namely, one slider for each guide groove 8A. An axis 44 is put through each slider 38 as shown in FIG. 5 and a link 45 is fixed to the axis 44. Two wheels 46, 47 are supported rotatably by the link 45. A fitting table 39 of wheel-shape which has flanges on both sides and is supported slidably and rotatably between guide bars 37, 37 of the lift frame 34 is fixed to a lower end of the axis 44. A rod 48 is fixed downwardly to the fitting table 39 and the transfer plate 9 is fixed to a lower end of the rod 48.

Each slider 38 is of the same construction and two wheels 46, 47 provided at the link 45 are supported by a guide rail 49 (for widening the width of the transfer plate) arranged above the guide plate 8 and along the curve of the guide plate. This guide rail 49 is located above the guide plate and a groove 49G is formed between adjoining guide plates. The two wheels 46, 47 are fixed in this groove 49.

The transferring apparatus as composed above has the following motion.

When bean curd of cylinder form transferred by driving of conveyor 23 passes through the position of the transfer plate 9, a sensor (not shown in the drawing) detects it. When the lift frame 34 on the transfer plate side descends, the fitting table 39 supported by the guide bar 37 of the lift frame 34 descends along the axis 44 provided at each slider 38, whereby each transfer plate 9 descends and is inserted in respective guide groove 8A. In this state, if a cylinder 60 for cutting and separating supported on the fixed side is driven, the apparatus 30 as a whole moves along the rail 30R because a rod 61 of the cylinder 60 is connected to an arm 62 provided on the pallet 31 protrudingly. At this time, each slider 38 moves along the shape of the guide groove 8A as it is guided by wheels 46, 47 fitted in the groove 49G of the guide rail 49. When bean curd is transferred by the transfer plate, it is cut into pieces of fixed size by the cutting blades provided at a forward end of each guide plate 8. By the advancing of the pallet 31, each transfer plate is moved along the guide groove 49G as it is led by the guide rail 49, whereby bean curd is transferred accurately under the water. Laying down plates 10 are provided at the terminal point of the guide groove 8A as in the case of the first embodiment but receiving plates 11 are dispensed with in the second embodiment.

If the pallet 31 moves forward up to the predetermined position, it is retreated to transfer the next lot of bean curd.

The pallet 31 is retreated after the lift frame 34 has been lifted by reversing the cylinder 36 and accordingly the transfer plate was lifted above the guide groove 8A, whereby sliders 38 come close to one another as they are led by the guide rails 49, contrary to the case where the pallet 31 advances. Thus, the pallet repeats the process which comprises a forward movement and a backward movement, by which bean curd of cylinder form sent out of the coagulating process is cut into pieces of fixed size as it is transferred in the hot water tank and cut pieces of bean cut are separated from one another. At the terminal position of the guide groove A, a conveyor 50 is provided adjacent a bottom plate 81 and bean curd transferred to 8B from 8A of guide groove is further transferred to the succeeding process.

The conveyor 50 comprises two chains 53, each stretched between sprocket wheels 51, 52, provided in parallel on both sides and many bars 54 arranged at regular intervals between the chains 53. Bean curd laid down by the laying down plate 10 is transferred to the packing process as it is supported by the conveyor 50 and passing through the guide groove 8B between guide plates 8.

The receiving plates 13 are provided at the terminal position of the conveyor 50. Pushing machines 15 are provided between the terminal position of the conveyor 50 and the transfer conveyor 17 so that bean curd is inserted in each pack P on the transfer conveyor 17 through the conveyor 50 and the receiving plates 13. As shown in FIG. 6, the pushing machine 15 has cylinder 152 for pushing which drives in the bean curd transferring direction and is supported on a frame F above the hot water tank 6 through the medium of brackets 151, a rod 153, a cylinder 154 for lift and a plurality of pushing plates 156 provided protrudingly at a rod 155 of the cylinder 154. It is so designed that when these pushing plates 156 are in descending state and advances by the driving of the cylinder 152, bean curd is pushed in the pack P from the end portion of the conveyor 50 through the receiving table 13, after which the pushing plates 156 ascend or retreat. By repeating this motion, bean curd of the fixed size is stuffed in a pack one by one.

In the second embodiment, the transfer conveyor 17 enters into the hot water tank in such a fashion that it crosses the tank and packs are supplied in a row onto the transfer conveyor 17 from the pack supplying machine 18 arranged above thr transfer conveyor 17 and in such a fashion that is moves over the conveyor 17 at one end outside the hot water tank. The drawing out roller 19 is provided under the pack supplying machine 18 as in the case of the first emboidment. However, pouring of hot water into each pack is carried out while packs are transferred into the hot water tank after they were placed on the transfer conveyor 17. In this embodiment, guides 55 are provided on upper both sides of and along the conveyor so that packs P placed on the transfer conveyor may be soaked in the hot water of the tank accurately. When packs P are transferred by the driving of the transfer conveyor 17 as their edge part being held between upper and lower guides, they are transferred accurately under the hot water, without floating on the water, as shown by FIG. 6. The transfer conveyor 17 is loaded with packs P at its one end and the packs P are transferred into the hot water, after which bean curd is stuffed in each pack P and packs P containing bean curd are transferred to the wrapping up process (not shown in the drawing). By carrying out the stuffing of bean curd into each pack and placing of packs on the conveyor at different places, even if supply of packs from the pack supplying machine lacks accuracy, packs can be replenished onto the conveyor in the course of transfer.

As shown in FIG. 6, a pack guide 200 is of sidefacing U shape and is supported pivotally at one end thereof by an arm 201 which is arranged in such a fashion that it strides over a wall of the hot water tank. A rod 203 of a cylinder 202 fixed by a frame F is engaged with a part of the arm 201 and by the driving of the cylinder 202 the pack guide 200 is swung through the medium of the arm 201. When the pack guide 200 is in a solid line position in FIG. 6, bean curd is led accurately into a pack P by the pack guide.

According to the present invention, use of natural bittern (magnesium chloride as main ingredient) does not cause irregularity of coagulation and all processes including a coagulating process in which coagulation is effected on continuous basis, a separating process in which bean curd is cut into pieces of the fixed size and cut pieces of bean curd are separated from each other and a packing process are carried out free of contact with the air, and transfer of bean curd is done automatically in the hot water of a temperature at which germs are not allowed to be alive. Thus, bean curd is free on touch of the hands of operators and also is free from sticking and the propagating of various germs. As bean curd in a germ-free condition is packed and sealed hermetically, the bean curd keeps long.

The present invention has such advantage that it enables to manufacture automatically and at high production efficiency delicious bean curd by using natural bittern.

What is claimed is:

1. An apparatus for automatically manufacturing bean curd comprising:
    a coagulating tank means;
    transferring means for transferring soy bean milk located in said coagulating tank means, said transfer means having a first and second end;
    pouring means for pouring uncoagulated soy bean milk into said first end of said transferring means;
    heating means for heating said coagulating tank means to a temperature sufficient for coagulating soy bean milk in said coagulating tank means, and the coagulated soy bean milk being transferred by said transferring means to said second end thereof;
    means for receiving, cutting, and transferring coagulated soy bean milk located adjacent to said transferring means and said coagulating tank means, said means for receiving, cutting, and transferring receiving coagulated soy bean milk from said second end of said transferring means, cutting the coagulated soy bean milk, and transferring the cut coagulated soy bean milk to a packing means;
    hot water tank means for holding water to continuously cover coagulated soy bean milk being transferred on said receiving, cutting, and transferring means;
    packing means for packing the cut coagulated soy bean milk transferred from the receiving, cutting, and transferring means;
    hot water supplying means for supplying hot water to said packing means for keeping the cut coagulated soy bean milk continuously covered with hot water during the packing thereof by said packing means; and
    wherein, said hot water tank means and said hot water supplying means keep the coagulated soy bean milk continuously covered with hot water for maintaining the integrity of the coagulated soy bean milk and for preventing the introduction of germs thereto.

2. An apparatus as in claim 1 further comprising:
    a separating means for receiving and separating cut coagulated soy bean milk cut and transferred by said means for receiving, cutting, and transferring.

3. An apparatus as in claim 2, wherein said separating means includes a plurality of guide grooves for separating cut coagulated soy bean milk, and a plurality of transfer plates for transferring the cut coagulated soy bean milk along each guide groove of said plurality of guide grooves.

4. An apparatus as in claim 1, wherein said packing means includes a transfer conveyor means for supplying packs for having the cut coagulated soy bean milk packed therein, said hot water supplying means having means for supplying the packs continuously under hot water, a pushing device for pushing cut coagulated soy bean milk into the packs, and pack guides for guiding the cut coagulated soy bean milk pushed by said pushing device.

* * * * *